United States Patent
Secibovic

(10) Patent No.: US 12,134,527 B2
(45) Date of Patent: Nov. 5, 2024

(54) AUTOMATED VACUUM GRIPPER AND METHOD FOR SECURELY GRIPPING COMPONENTS

(71) Applicant: TRUMPF Maschinen Austria GmbH & Co. KG., Pasching (AT)

(72) Inventor: Kabir Secibovic, Gunskirchen (AT)

(73) Assignee: TRUMPF Maschinen Austria GmbH & Co. KG, Pasching (AT)

(*) Notice: Subject to any disclaimer, the term of this patent is extended or adjusted under 35 U.S.C. 154(b) by 872 days.

(21) Appl. No.: 17/274,970

(22) PCT Filed: Sep. 16, 2019

(86) PCT No.: PCT/AT2019/060303
§ 371 (c)(1),
(2) Date: Mar. 10, 2021

(87) PCT Pub. No.: WO2020/056437
PCT Pub. Date: Mar. 26, 2020

(65) Prior Publication Data
US 2022/0033199 A1 Feb. 3, 2022

(30) Foreign Application Priority Data
Sep. 20, 2018 (AT) .............................. A 50803/2018

(51) Int. Cl.
*B25J 13/06* (2006.01)
*B25J 15/00* (2006.01)
(Continued)

(52) U.S. Cl.
CPC ........ *B65G 47/917* (2013.01); *B25J 15/0061* (2013.01); *B25J 15/0616* (2013.01); *B25J 15/0641* (2013.01)

(58) Field of Classification Search
CPC ............................ B65G 47/917; B65G 61/00; B65G 2201/022; B65G 47/914; B65G 47/918;
(Continued)

(56) References Cited

U.S. PATENT DOCUMENTS 5,553,893 A   9/1996  Foti
5,752,729 A   5/1998  Crozier et al.
(Continued)

FOREIGN PATENT DOCUMENTS

CN    201432302 Y    3/2010
CN    202702249 U    1/2013
(Continued)

OTHER PUBLICATIONS

International Search Report in PCT/AT2019/060303, mailed Jan. 20, 2020.

*Primary Examiner* — Masud Ahmed
(74) *Attorney, Agent, or Firm* — Collard & Roe, P.C.

(57) ABSTRACT

The invention relates to a method for conveying components and to an automated vacuum gripper (1) for components (3), in particular sheet metal parts, comprising a plurality of suction elements (4), which are arranged at a preferably movable support part (5), a first vacuum generator (8) for forming a first vacuum circuit (9), a second vacuum generator (10) for forming a second vacuum circuit (11), at least one switching element connected to a system controller (14) for automated switching of the first vacuum circuit (9) to the second vacuum circuit (11), at least one compressed air supply (15) connected to at least the first and the second vacuum generators (8), at least one sensor device (16, 17), wherein the first vacuum generator (8) is associated with a first predeterminable group (12) of suction elements (4), and the second vacuum generator (10) is connected to a vacuum tank (18) for forming a second vacuum circuit (11), which may be activated in case of emergency and is redundant to (Continued)

Figure 4:
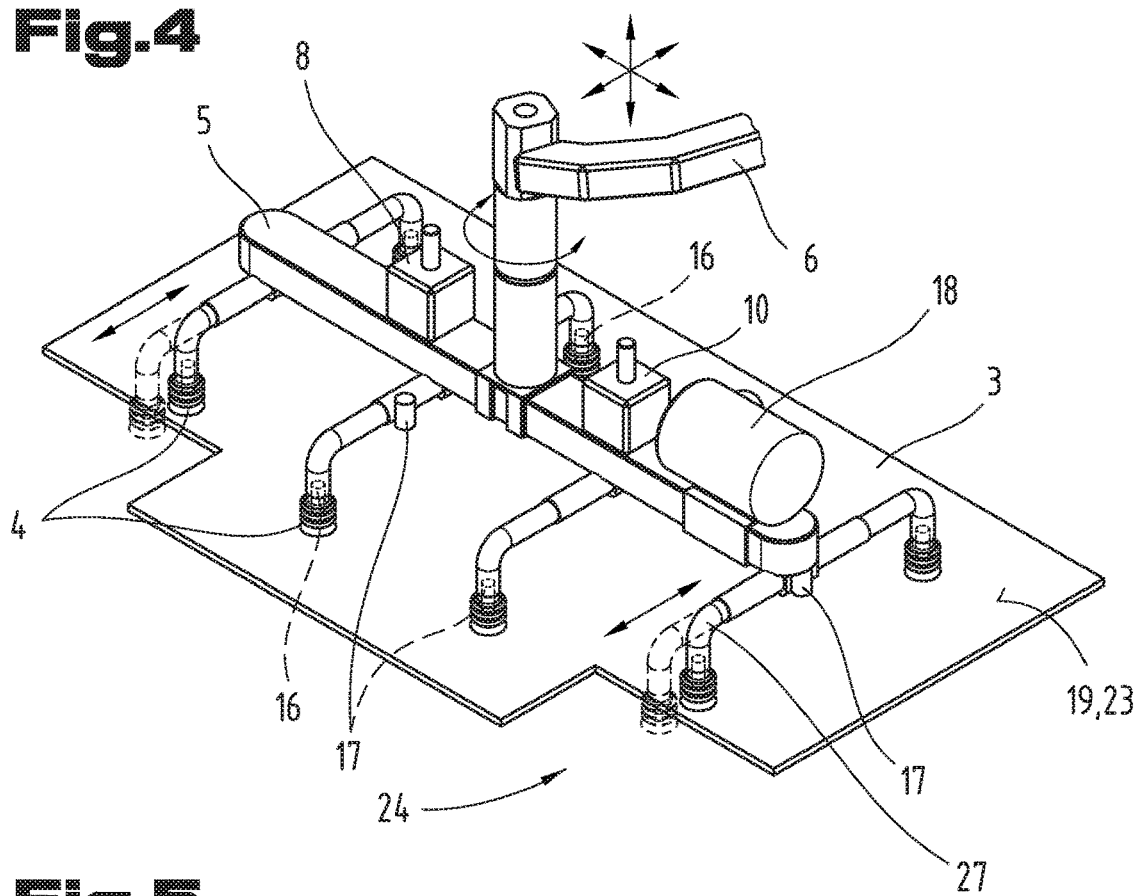

the first vacuum circuit (9), and wherein at least one first sensor device is (16) is formed for monitoring the vacuum at least at the first vacuum circuit (9), and at least one second sensor device (17) has an optical sensor for detecting a relative movement of the component (3) during a conveying operation.

18 Claims, 3 Drawing Sheets

(51) Int. Cl.
    *B25J 15/06*     (2006.01)
    *B65G 47/91*     (2006.01)

(58) Field of Classification Search
CPC .......... B25J 15/0061; B25J 15/0616; B25J 15/0641; B25J 15/0052; B25J 19/021; B21D 43/18; B21D 5/0281; B66C 1/0212; B66C 1/0218; B66C 1/0243

See application file for complete search history.

(56) References Cited

U.S. PATENT DOCUMENTS

| | | |
|---|---|---|
| 8,070,203 B2 * | 12/2011 | Schaumberger ...... B66C 1/0243 294/186 |
| 8,960,745 B2 | 2/2015 | Regan et al. |
| 9,205,558 B1 * | 12/2015 | Zevenbergen ......... B25J 9/1664 |
| 9,656,813 B2 * | 5/2017 | Dunkmann ........... B25J 15/0675 |
| 10,518,985 B2 * | 12/2019 | Strobel ................. B66C 1/0218 |
| 11,453,179 B2 * | 9/2022 | Reinhold ................. B32B 7/12 |
| 2008/0011918 A1 | 1/2008 | Bruce et al. |
| 2015/0147141 A1 * | 5/2015 | Truyens ............... B25J 15/0616 414/800 |
| 2015/0214085 A1 * | 7/2015 | Jin ....................... B25J 15/0666 294/185 |
| 2015/0352726 A1 * | 12/2015 | Harter ................. B25J 15/0691 294/185 |
| 2016/0016311 A1 * | 1/2016 | Konolige .............. B25J 9/1664 901/30 |

FOREIGN PATENT DOCUMENTS

| | | |
|---|---|---|
| CN | 207375329 U | 5/2018 |
| DE | 10 2005 045 681 A1 | 4/2007 |
| DE | 20 2012 013 422 U1 | 12/2016 |
| DE | 20 2016 101 454 U1 | 6/2017 |
| EP | 0 657 673 B1 | 6/1995 |
| EP | 3 251 996 A1 | 12/2017 |
| JP | 2013-154968 A | 8/2013 |
| KR | 20140012380 A | 2/2014 |
| WO | 95/12541 A1 | 5/1995 |

\* cited by examiner

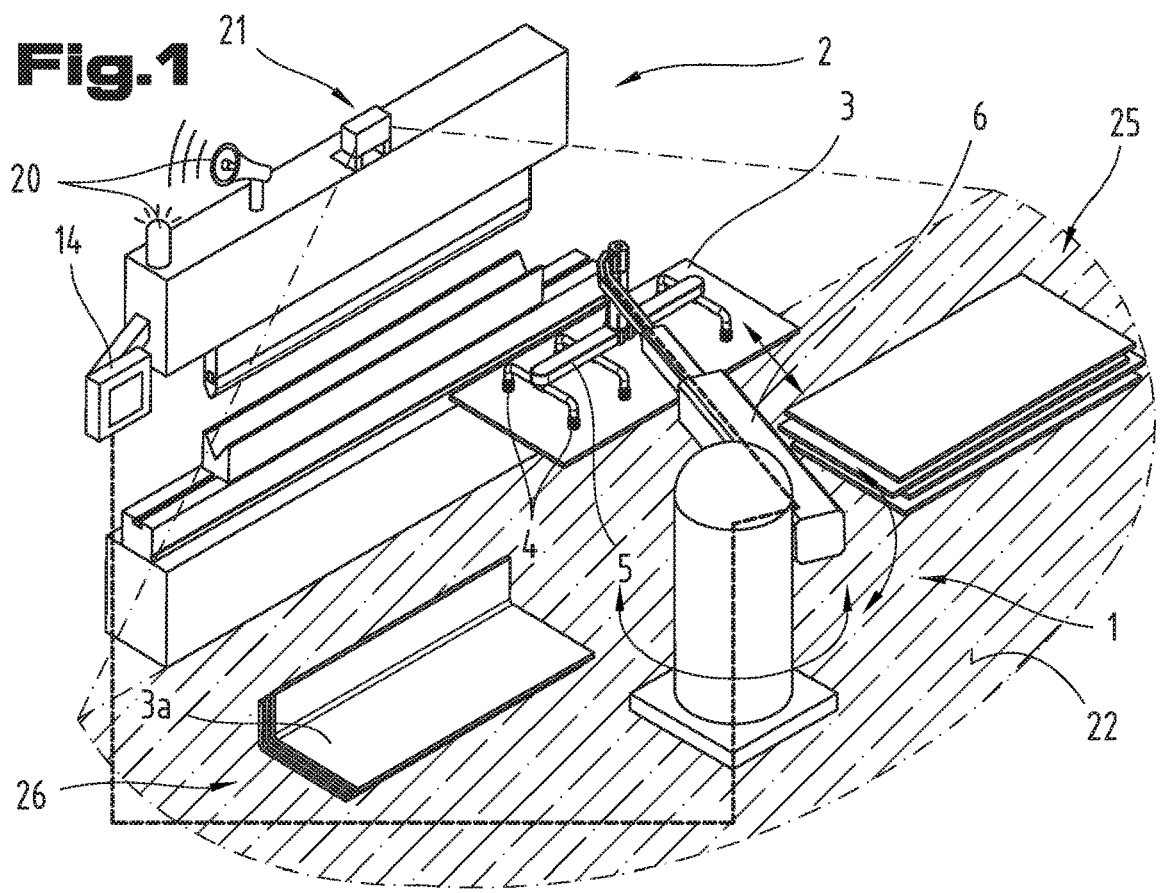
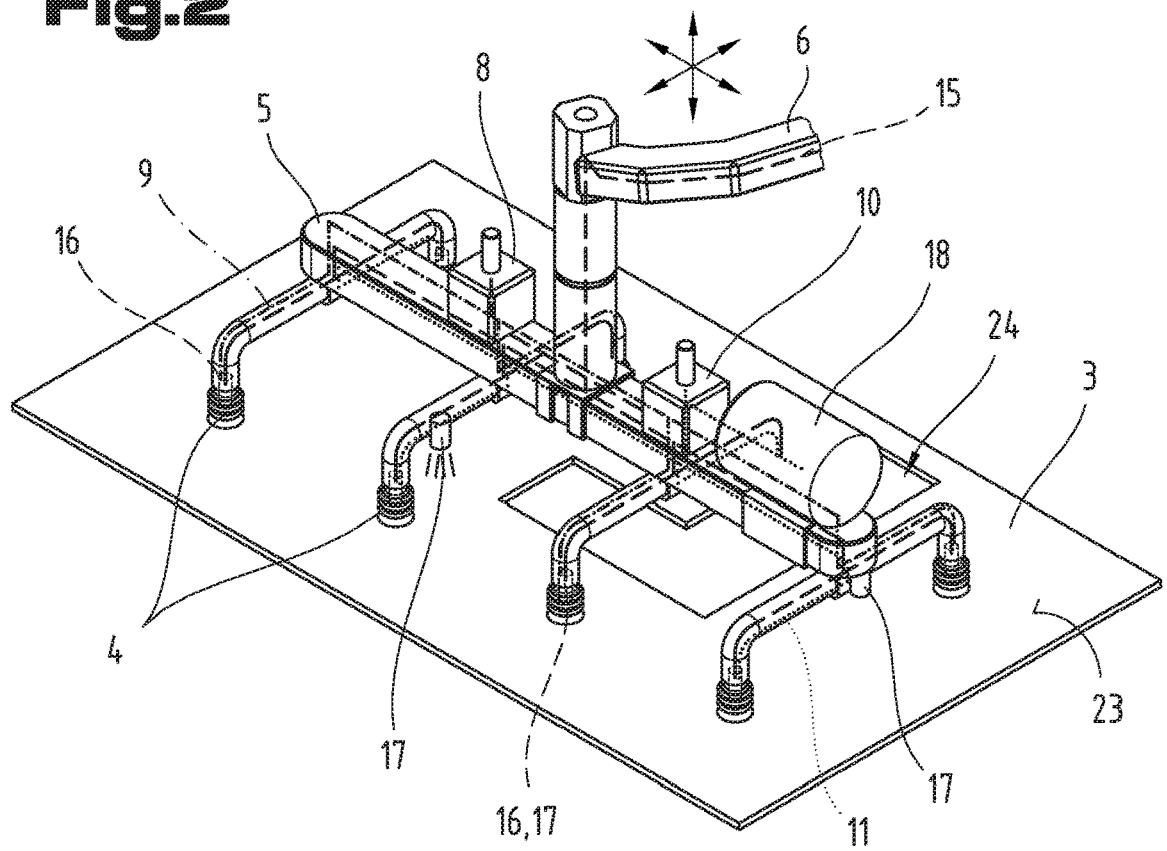

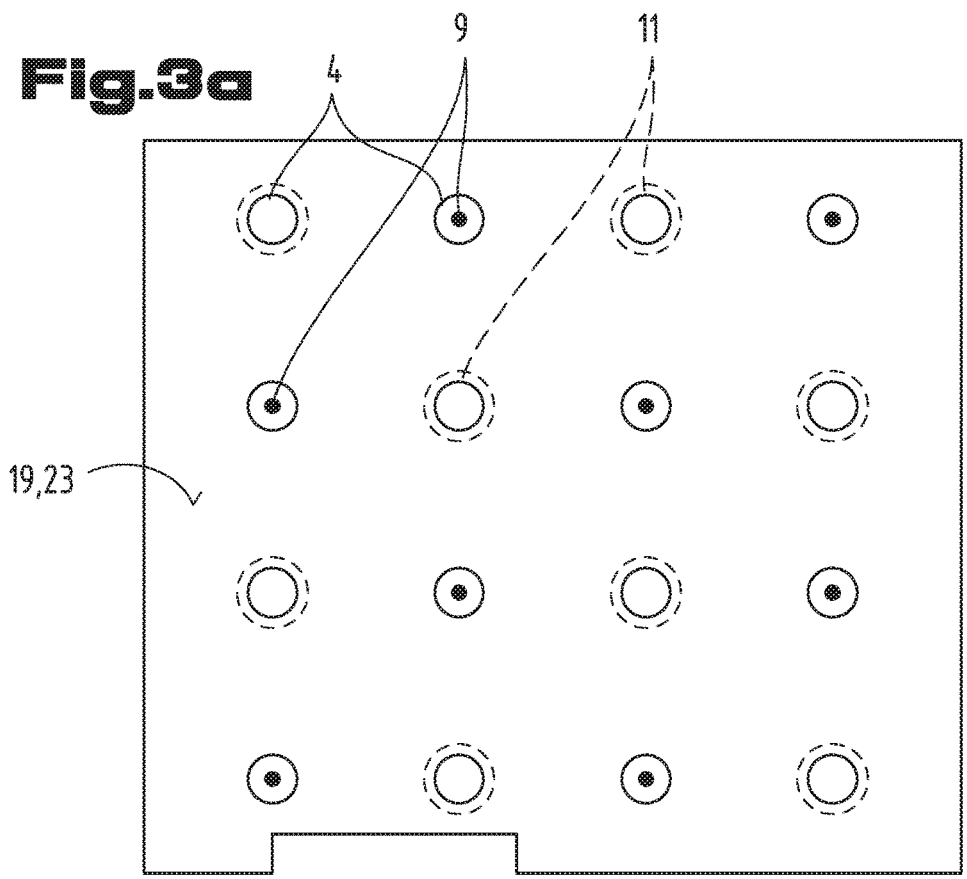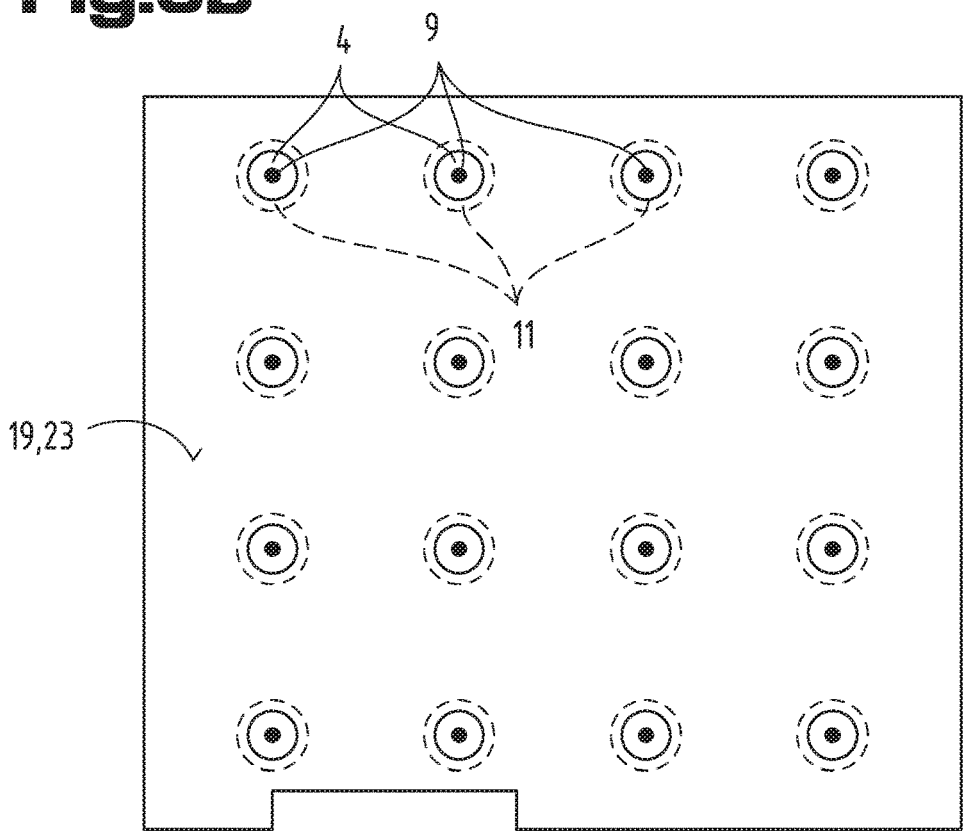

AUTOMATED VACUUM GRIPPER AND METHOD FOR SECURELY GRIPPING COMPONENTS

CROSS REFERENCE TO RELATED APPLICATIONS

This application is the National Stage of PCT/AT2019/060303 filed on Sep. 16, 2019, which claims priority under 35 U.S.C. §119 of Austrian Application No. A 50803/2018 filed on Sep. 20, 2018, the disclosure of which is incorporated by reference. The international application under PCT article 21(2) was not published in English.

The invention relates to a method for securely conveying components, in particular sheet metal parts, as well as to an automated vacuum gripper, wherein a first and a second vacuum circuit are formed, and a vacuum tank connected to the second vacuum circuit is automatically used for maintaining the vacuum between the vacuum gripper and the gripped component when required.

In modern machining centers, workpieces and components are often transported in a fully automated manner. To avoid damage to the component surface or in order to be able to grip a plurality of similar components, the use of vacuum grippers has been widely established. Especially for targeted manipulation of sheet metal parts that are fed into a bending machine, positioned therein and conveyed further by it in the formed state, using vacuum grippers offers significant advantages as opposed to conventional mechanical grippers and the like.

The person skilled in the art knows different approaches for picking up individual components or workpieces up by means of a plurality of suction cups at a joint gripper head of a generic vacuum gripper.

US 2015/0147141 A1, for example, presents a method with a gripper head having a plurality of suction cups, which are associated with a first and a second vacuum circuit and used for gripping workpieces out of a container and conveying them. In this regard, the gripper head in US 2015/0147141 A1 comprises one or multiple rows of suction cups, which are jointly associated with a first shared vacuum circuit, and a second row of suction cups, which are associated with a second vacuum circuit. In this regard, the second vacuum circuit may be controlled specifically in order to effectively create a vacuum only at those suction cups of the second vacuum circuit where it is required. However, such an arrangement does not offer any advantages in the case of larger components, where a plurality of suction cups are simultaneously required for transport. Moreover, only during reception do pressure sensors at each suction cup check whether sufficient negative pressure may be built up, and this check is not possible in the case of wrongly inserted or missing components.

Likewise, the person skilled in the art knows a number of devices for picking up, temporarily fixating and conveying components of different sizes, wherein only those suction cups of a gripper head are active, i.e. impinged with a vacuum, which correspond to the shape of the component. EP 0657673 B1 shall be mentioned as an example here, where a gripper head having a plurality of suction cups is presented, wherein the suction cups are combined into individual groups that may be controlled as required. In this regard, EP 0657673 B1 discloses one group of fixed and two groups of height-adjustable suction cups, wherein the height-adjustable suction cups are active depending on the determined size of a component or may be disabled if required. The fixed and height-adjustable groups are associated with different but shared vacuum circuits with separate lines to a shared pump. By arranging the different suction cups in groups or vacuum circuits, the "shape" of an even component may be imitated as required by controlling the suction cups; however, local failure or a leak at a suction cup may still result in a shift or even loss of the component while it is conveyed.

The increasing machining speeds, which also require increasing conveying and positioning speeds, pose another challenge for safe vacuum grippers. The centrifugal forces on the held components thereby increase as well, which may lead to loss of the component if the contacting of the vacuum gripper is incorrect. In the case of sheet metal parts, which are often sharp-edged, such loss of a component may result in an uncontrolled movement in the machining area. Up to now, safety fences limiting the machining area were used for protecting workers and/or adjacent units. However, safety fences constitute a relatively rigid boundary, and their construction is expensive. Moreover, moving the machining unit to another location in a production hall is very complex as the safety fences have to be disassembled and reassembled, and all safety measures have to be implemented.

It has been the object of the present invention to overcome the disadvantages of the prior art and to provide a device and a method by means of which a component may be easily and securely gripped and conveyed by applying a vacuum. In addition, it has also been an object of the invention to provide additional monitoring of a possible movement of the component during conveying and to take appropriate countermeasures in the case of relative movement of the component relative to the vacuum gripper. Another object of the invention is to be able to dispense with the construction of safety fences in the future.

This object is achieved by an automated vacuum gripper and a method according to the claims.

The automated vacuum gripper according to the invention for components or workpieces, in particular sheet metal parts, comprises a plurality of suction elements, which are arranged at a preferably movable support part. The vacuum gripper further comprises at least one first vacuum generator for forming a first vacuum circuit between at least one suction element and the component to be gripped, a second vacuum generator for forming a second vacuum circuit, and at least one switching element connected to a system controller for automated switching of the first vacuum circuit to the second vacuum circuit. Moreover, the vacuum gripper has at least one compressed air supply connected at least to the first and the second vacuum generators as well as at least one first and one second sensor device. The first vacuum generator is associated with a first predeterminable group of suction elements, and the second vacuum generator is connected to a vacuum tank for forming a second vacuum circuit, which may be activated in case of emergency or alarm and is redundant to the first vacuum circuit. The at least one first sensor device is configured for monitoring the vacuum at least at the first vacuum circuit, and the vacuum gripper has at least one second sensor device in the form of an optical sensor for detecting a relative movement of the component during a conveying operation.

In this regard, the suction elements or suction cups comprise a seal facing the component to be gripped, sleeves or similar flexible endpieces as known to the person skilled in the art, which may be directly attached to the support part or to a mounting at the support part. The suction elements are preferably controllable separately from the system controller and may preferably each have a valve or similar vacuum switches that are controllable by the system controller. The suction elements thus constitute an interface between the vacuum system and the component to be moved.

In the context of the present invention, vacuum means that the negative pressure at at least one suction element is lowered below atmospheric pressure, wherein lifting or moving of the component is enabled at sufficiently low vacuum. The force for moving the component is preferably transmitted by a multiaxially movable robot or manipulator via a support arm to the support part with the suction elements. The vacuum generators may be understood as electric and/or pneumatic devices for generating negative pressure or a vacuum in the vacuum system, wherein the vacuum generators are preferably configured as vacuum ejectors. Such vacuum generators work according to the Venturi principle, wherein compressed air is introduced from the compressed air supply into a vacuum ejector and the dynamic pressure increases through acceleration in a Venturi nozzle, wherein the static pressure of the air decreases and air is sucked into the vacuum ejector at a vacuum connection. The resulting negative pressure at the vacuum connection may be distributed to one or multiple suction elements via a line network, whereby a first vacuum circuit is formed. Such vacuum generators and suitable line networks are mostly known to the person skilled in the art and therefore require no further explanation at this point.

According to the invention, however, a second vacuum circuit is provided, which is only activated in emergencies by the system controller via a dedicated switching element. This second vacuum circuit is configured as a vacuum circuit that is redundant to the first vacuum circuit and has a separate vacuum tank. The vacuum tank may be placed under a vacuum by a second vacuum generator, and this vacuum may be "temporarily stored". If required, the vacuum tank may be used for building up a vacuum at suction elements of the first and/or second vacuum circuits very quickly, i.e. substantially without any delay, and maintaining it for a limited period of time intended for taking protective or countermeasures.

In addition, at least two sensor devices are provided at the vacuum gripper, wherein at least one first sensor device is used for checking the negative pressure or vacuum in the first and/or second vacuum circuits, wherein at least one additional second sensor device is used for checking and monitoring a possible relative movement of the component to be moved.

In this regard, the first sensor device may, for example, be arranged within the first and/or second vacuum circuits as pressure measurement cells, pressure sensors, or the like, in a way known to the person skilled in the art. In this regard, the second sensor device is configured as an optical sensor, which periodically or continuously scans the component surface to be gripped, basically similarly to the principle of a "mouse sensor".

The vacuum gripper according to the invention is thus perfectly suitable for automated use, wherein in the method according to the invention for conveying the components, in particular sheet metal parts, at least the following method steps are performed:

providing an automated vacuum gripper, preferably according to one of claims 1 to 13;

picking a component up by means of the vacuum gripper by creating a vacuum at at least one suction element and a surface of the component, thus forming a first vacuum circuit;

monitoring the vacuum of the first vacuum circuit by means of at least one first sensor device;

monitoring a position of the component relative to at least one second sensor device of the vacuum gripper, which sensor device is configured as an optical sensor;

conveying the component to a predeterminable destination, wherein, if a relative movement of the component and/or an increase in pressure in the first vacuum circuit has been detected, an alarm is triggered in the system controller.

Due to the ongoing, i.e. periodic or continuous monitoring of the applied vacuum and the position of the component relative to one or multiple second sensor device(s), protection against loss of the component during the movement may be significantly increased. This redundancy monitoring is supplemented by the redundant second vacuum circuit as a redundancy holder; this way, in the case of negative pressure—i.e. an unintentional drop of the vacuum—in the first vacuum circuit, an alarm is immediately sent to the system controller. The system controller immediately ensures switching from the first to the second vacuum circuit; this way, a vacuum which is at least effective for a short period of time may be activated in the suction elements of the first and/or second vacuum circuits.

This way, inadequately contacted components may be reliably detected. The necessary structural measures may be realized at relatively low cost and comparatively simply implemented into a system controller. By means of the vacuum tank, a quickly "accessible" vacuum is provided, which may prevent loss of a component. By means of the presented automated vacuum gripper and the method according to the invention, forming a protective fence limiting the machining area may be avoided. In addition to lower costs, higher flexibility of the machining center in which the vacuum gripper is used may be achieved.

Furthermore, the vacuum gripper may be configured such that the suction elements may be actively impinged with compressed air, which may accelerate deposition of the component by interrupting the first and/or second vacuum circuits. It is thus also possible to blow off held components via the compressed air supply at the individual suction elements. Suitable valves and/or switches for separating the compressed air supply from the first and/or second vacuum circuits for blowing off components are to be provided by the person skilled in the art and do not need to be discussed any further at this point.

Moreover, according to the invention, it may be provided that in the case of a detected relative movement of the component and/or unintentional interruption of the first vacuum circuit, a second vacuum circuit, which is redundant to the first vacuum circuit, is activated, wherein a vacuum tank is used for supplying the second vacuum circuit for a short period of time.

It may further be appropriate if the second vacuum generator and the vacuum tank are arranged at the support part, wherein the support part is arranged at a—preferably multiaxially—movable support arm of the vacuum gripper.

Due to the very short line paths from the vacuum tank to the individual suction elements, this embodiment allows a very swift response in the event of an emergency or when an alarm is given. In this regard, the vacuum tank may be directly mounted at the support part or on a dedicated mounting. In addition, the mobility of the support part is not significantly limited by the vacuum tank, and safety during operation is thus increased.

It may further be provided that a volume of the vacuum tank is greater than a total volume of at least the first predeterminable group of suction elements.

The first group of suction elements are those suction elements which are at least required for conveying the component. Where required, the sum of the volumes of these suction elements and any lines from the vacuum generator to the suction elements should be smaller than the capacity, i.e. the available vacuum, of the vacuum tank. This may be relatively easily provided by the person skilled in the art in the construction according to the aforementioned total volume and enables reliable "subsequent intervention" of the second vacuum circuit.

Moreover, it may be provided that the at least one optical sensor comprises a light source, which is configured as a light-emitting diode or a laser diode with a predeterminable wave length or a predeterminable wave length range.

As undesirable reflections may occur on surfaces of components, in particular sheet metal parts, this measure has proven to be particularly effective for operating the optical sensor in a wave length range that allows reliable operation. Especially in the case of highly reflective surfaces of sheet metals in the red wave length range, a wave length range in the green, blue or UV range may be used for improved recognition of relative movements. Likewise, a suitable choice of the wave length range may reduce any scattered or ambient light influences, which may increase operational safety. Depending on the expected surface of a component series, it is possible to store suitable reflection spectra in the system controller and/or to predetermine the wave length or wave length spectra of the optical sensor, for example by selecting a suitable light source. By means of LEDs or laser diodes, for example, multiple light sources of different wave lengths or ranges that are selectable from the system controller may be space-savingly and efficiently arranged in an optical sensor.

An embodiment is also advantageous according to which it may be provided that the at least one optical sensor is arranged at the support part and/or within a suction element.

Although the optical sensor may be located a few centimeters away, it has proven to be particularly advantageous if it is arranged in immediate proximity of the component to be moved. Arrangement within a sensor or multiple sensors in multiple different suction elements may additionally have the advantage that unintentional touching of the optical sensor or damage thereof is avoided. Furthermore, such an arrangement may reduce the influence of ambient light due to the isolation provided by the suction element or a seal.

According to a further development, it is possible that two second optical sensor devices are arranged at the support part at or within different suction elements.

According to the basic concept of the invention, undesirable relative movement of the component may already be detected by means of a second sensor device, and appropriate countermeasures may be initiated by the system controller. However, it has proven to be particularly advantageous if a second or multiple second sensor devices are provided at the support part or within multiple suction elements. On the one hand, functionality of the vacuum gripper may also be ensured in the case of components of different sizes this way. On the other hand, if a relative movement is detected by two second sensor devices that are independent of one another, the speed and/or acceleration of the component may be calculated by the system controller. This way, a trajectory and/or a probable impact point of the component in the event of loss may be calculated more precisely, which may increase safety and ensures that any necessary countermeasures may be initiated by the system controller in a more targeted manner.

Moreover, it is conceivable that when multiple optical sensors are used, the respective sensors use different wave lengths or ranges, whereby a simplified structure of the optical sensors may be achieved, and different reflecting surfaces or relative movement thereof may nevertheless be reliably detected.

The vacuum system of the vacuum gripper according to the invention may comprise joint or separate lines between the first vacuum generator and the suction elements associated with the first vacuum circuit as well as separate lines between the second vacuum generator and the vacuum tank and the suction elements associated with the second vacuum circuit.

In this regard, it may be appropriate if the second vacuum circuit is formed at separate suction elements, which form a second group and are additional to the first group.

This embodiment may be understood such that the suction elements are arranged, for example, in the form of an "array", and that in a first and/or second direction, only a number of suction elements are associated with the first group, i.e. the first vacuum circuit. The component may thus be securely gripped by the suction elements of the first vacuum circuit, wherein the suction elements of the second group are not actively arranged at positions of the "array", which substantially correspond to the intermediate positions of the first group of suction elements. In this regard, through the suction of the first group of suction elements, the suction elements of the second group of suction elements are also in contact at least with parts of the component surface; however, no vacuum is actively applied to the second vacuum circuit. As described above, in the event of an alarm, the suction elements of the second group, i.e. the second vacuum circuit, may be activated and are "immediately" ready for use. Due to the separate lines of the first and second groups, i.e. the first and second vacuum circuits, a leakage at the line network of the first group may be largely eliminated as a factor for a possible component loss, as the second vacuum circuit is provided for use substantially completely redundantly and independently.

Moreover, it may be provided that the second vacuum circuit is connected to the first vacuum circuit, preferably via a joint line network.

This alternative embodiment allows a very cost-effective construction of the line network, wherein the suction elements are connected to the first and second vacuum circuits, and only the first vacuum circuit is active. In the event of an alarm, the above-described switching to the second vacuum circuit may be performed, and safety may be ensured. This embodiment may be particularly advantageous if a small number of suction elements are used or the component dimensions have small surfaces and the vacuum gripper is accordingly configured in a space-saving manner. In addition, weight may be reduced by saving separate suction elements and/or lines of the second vacuum circuit; this way, higher acceleration of the vacuum gripper during conveying of the component may be achieved.

It may further be provided that at least two of the suction elements are pivotable relative to the support part and/or height-adjustably arranged at the support part.

This measure may be advantageously used, in particular in the case of components with large surfaces, for compensating a possible distortion of the component. Such a distortion may be a deviation of individual areas of the surface of the component, with an ideal even surface of the component being referred to as "suction plane". For this purpose, the suction elements may be deflectably attached at the support part in a small angle range of 5° to approximately 15° relative to the suction plane. Height-adjustable suction elements, which are normally deflectable relative to the suction plane, may have the same effect. Suction elements movable in this way, i.e. through contacting by means of the support arm, may be passively deflectably arranged at the support part, or actively deflectably by means of suitable servomotors.

According to a special embodiment, it is possible that at least one suction element is adjustably arranged at the support part relative to, preferably at least in the direction of, the suction plane, preferably at a dedicated holding element.

This way, the suction elements may be actively adjusted in the direction of the suction plane relative to an imaginary longitudinal axis of the support part. This way, the suction elements may be prevented from "gripping into" or even "gripping through" components with cutouts. By adjusting the suction elements or a dedicated holding element, components with openings and/or cutouts may thus be securely contacted in a targeted manner. It may be provided that the component geometry is stored in the system controller, which enables automated control of the adjustable suction elements and any holding elements. The adjustable suction elements may be adjusted by means of suitable servomotors or sliders or the like, all of which are known to the person skilled in the art.

According to an advantageous further development, it may be provided that the support part has at least one support part element, which is pivotable or rotatable relative to a suction plane.

Such a measure may significantly increase versatility of the automated vacuum gripper for different component sizes. The at least one support part element may be arranged laterally at the support part and simply "folded down" if required, i.e. if a larger number of suction elements is required for larger component dimensions. The support part elements may thus have additional suction elements, wherein the aforementioned associations and/or controlling of the individual suction elements with a first and/or second vacuum circuit may be made here as well. As a consequence, the suction elements arranged at the support part elements may be divided into separately controllable additional groups to enable easy control. Likewise, the support part elements may be connected to the support part preferably by means of mechanical and/or pneumatic drives, which facilitates automated operation.

In particular, it may be advantageous if an optical and/or acoustic warning device is arranged at the support part and/or a housing of the vacuum gripper and/or a machine tool and connected to the system controller. When an alarm is triggered in the system controller, said acoustic and/or optical warning device may be activated.

This way, an operator may be optically and/or acoustically be informed in case of emergency. The optical warning device may be affixed in the form of signal lamps, for example at the machine tool or at the vacuum gripper. It is also conceivable to attach the optical warning device to individual suction elements in the form of LEDs or the like for indicating locally, i.e. at the detected failure location, that an insufficient vacuum is present. This facilitates swift error correction. The optical warning device may further also comprise an additional display of the alarm on a monitor of the system controller.

It may further be provided that an optical environment monitoring means, in particular light barriers and/or light fences, is connected to the system controller.

An optical environment monitoring means may be a three-dimensional detection system for movements in a predeterminable machining area or area of movement of the vacuum gripper. Such systems may be used separately or supplementally to light barriers and/or light fences that "limit" the machining area or area of movement. The vacuum gripper configured according to the invention thus allows dispensing with mechanical barriers of a machining area without compromising safety for an operator. The machining area or area of movement to be monitored may be stored in the system controller and serves for detecting a movement that is not foreseen by the system controller.

In this regard, it is advantageous if in the event of a detected movement within a machining area and/or the area of movement of the vacuum gripper, an alarm in the system controller is triggered by an environment monitoring means connected to the system controller.

When an alarm is triggered, appropriate countermeasures may be initiated by the system controller.

It may further be appropriate that, when an alarm is triggered, the speed of movement of a support arm of the vacuum gripper is reduced in a controlled manner and/or the conveyed component is lowered in the vertical direction.

These measures may be understood as additional countermeasures although increasing the suction capacity to the component by activating the second vacuum circuit constitutes the first effective countermeasure. Reducing the speed of movement of the support arm results in reduced centrifugal force and/or gravity acting on the component; this way, component loss in the case of a vacuum loss may be controlled or even avoided. The speed of movement may be reduced down to a controlled halt of the vacuum gripper. Likewise, the lowering of the support part or the support arm may be used for directing the component towards the floor in the case of a loss, which increases safety.

For better understanding of the invention, the latter is explained in detail with reference to the following figures.

Figure 5:
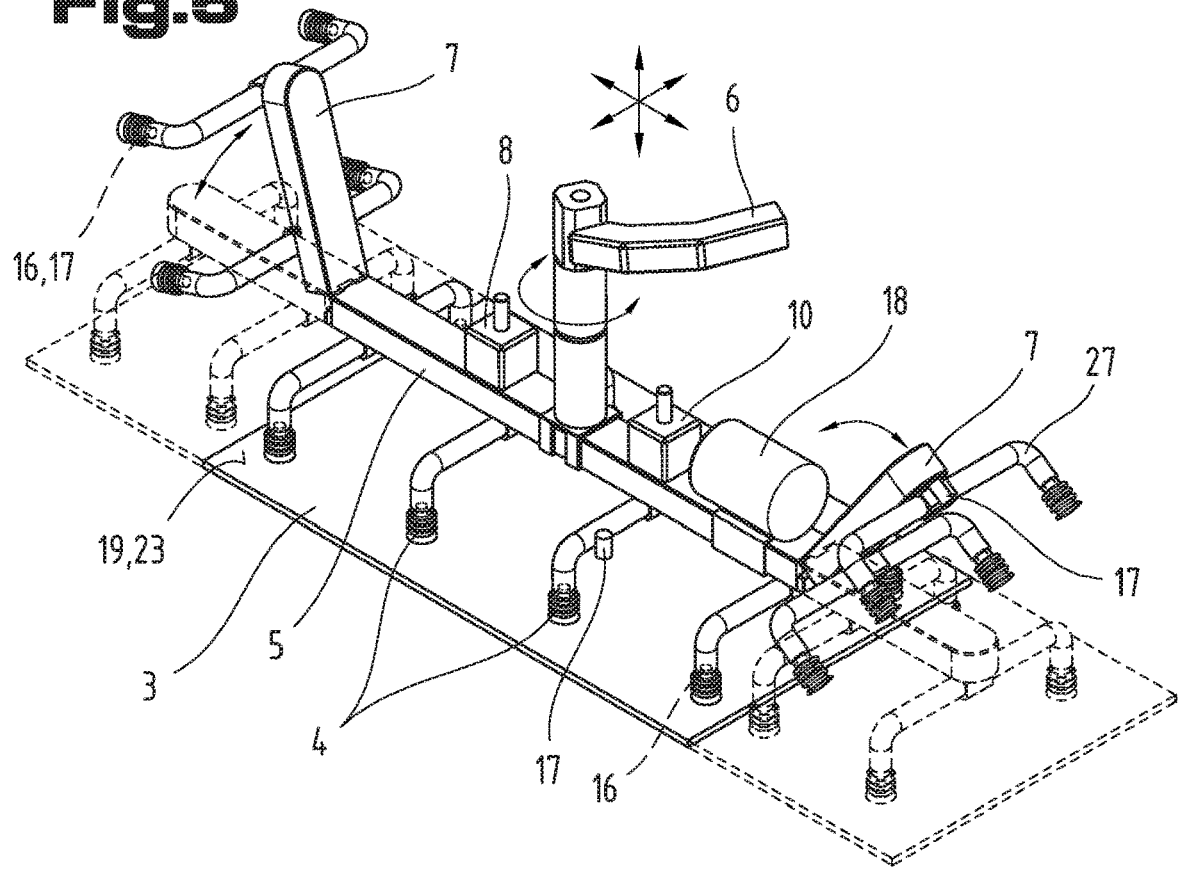

The following is shown in highly simplified, schematic representation:

FIG. 1 a schematic representation of a possible arrangement of a machining center;

FIG. 2 a schematic representation of a possible embodiment of a vacuum gripper;

FIG. 3 a schematic representation of the interconnection/functioning principle of the first and second vacuum circuits, which are associated with different suction elements (a) or identical suction elements (b);

FIG. 4 a possible embodiment of a vacuum gripper with a support part with adjustable suction elements;

FIG. 5 a possible embodiment of a vacuum gripper with a support part and support part elements.

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

In FIG. 1, a schematic representation of a possible machining center can be seen, wherein an automated vacuum gripper 1 can be seen apart from a machine tool 2. The vacuum gripper 1 serves for quickly and securely conveying components 3 from a reception location 25 to a machine tool 2 and/or a deposition location 26 for processed components 3a.

As can be seen from FIG. 1, in particular in combination with FIG. 2 and FIG. 4 and FIG. 5, the vacuum gripper 1 may be configured as a multiaxially movable manipulator or robot. On the movable support arm 6, a movable support part 5 is arranged, which has a plurality of suction elements 4 for contacting the component 3. For the sake of simplicity, the machining area 22 and the area of movement of the vacuum gripper are illustrated jointly by means of a hatched area, although this are should be understood as a three-dimensional space. This machining area 22 may thus be preferably three-dimensionally monitored by an environment monitoring device 21, wherein said environment monitoring device 21 is preferably arranged at an elevated location, for example on the machine tool 2. Alternatively, however, such an environment monitoring means 21 may also be arranged on a hall ceiling or at the vacuum gripper 1 itself. Light barriers or light fences, which are known to the person skilled in the art and not shown in FIG. 1, may be used as environment monitoring means 21 independently or in combination with the three-dimensional environment monitoring means 21 described above. The machining area 22 may also be additionally divided into a warning area and a further inward security area.

In FIG. 1, the exemplary arrangement of a system control 14 in the form of a display at the machine tool 2 can be seen. The connection to the vacuum gripper and any further components or elements of the machining center may be wired or wireless, for example via WiFi or Bluetooth, and is schematically indicated with a dashed line.

Furthermore, a schematic arrangement of elements of an optical and/or acoustic warning device 20 at the machine tool 2 can be seen in FIG. 1. Additional or alternative arrangements, for example at the vacuum gripper 1 and particularly in the form of optical warning devices 20 at the support part are not shown but easily comprehensible for the person skilled in the art.

In FIG. 2, a schematic representation of a possible embodiment of a support part 5 with a plurality of suction elements 4 arranged thereat is shown. As explained above, the support part 5 is movably attached to the support arm 6, which is movable as well, and a compressed air supply 15 is schematically indicated. As schematically shown with the dashed line, the compressed air supply 15 may be configured for supplying the first 8 and the second vacuum generators 10. The required lines are not shown. The dashed lines also show the possibility to connect the compressed air supply 15 to individual ones or all of the suction elements 4, for example to specifically interrupt a controlled, compressed-air supported interruption of the vacuum at the suction elements 4, or even to enable blowing off of the held component 3.

From FIG. 2, a possible advantageous arrangement of the two vacuum generators 8, 10 at the support part 5 can be seen. With the second vacuum generator 10, a vacuum tank 18 is connected for ensuring a vacuum redundantly and quickly when required. The formation of a first and a second vacuum circuit 9, 11 is only schematically indicated with dotted or dotted and dashed lines, wherein the second vacuum circuit 11 (dotted and dashed lines) must be connected to the vacuum tank 18.

The component 3, which is shown by way of example in FIG. 2 as a pre-bent sheet metal part with cutouts 24, is held by the suction elements 4, which are associated with a first group 12 of suction elements 4. The selected embodiment is intended to shown that it is possible to bring a second group 13 of suction elements 4 into contact with the component 3 as well, although no vacuum is applied to said suction elements 4 during normal operation.

In addition, the position of two second sensor devices 17 at the support part 5 can be seen from FIG. 2. This exemplary arrangement shows that the second sensor devices 17 configured as optical sensors may relatively easily detect a possible relative movement of the component 3 relative to the sensor devices 17 and thus also relative to the support part 5. A plurality of first sensor devices 16 are also shown by way of example as dashed elements, which may be arranged in the form of pressure sensors or pressure measurement cells preferably in the line network or directly at the suction elements 4 of the first and/or the second vacuum circuit 9, 11. Monitoring by the first and second sensor devices 16, 17 is carried out continuously, starting when the component 3 is picked up until it is deposited within the machine tool 2 or at the deposition location 26.

In the event of an interruption or even already in the event of a settable vacuum loss of the first vacuum circuit 9, the system controller 14 may give an alarm, which at least causes a switching element, which is not shown, to activate the second vacuum circuit 11. The alarm may also be given additionally or independently when a relative movement of the component 3 is detected by the at least one second sensor device 17.

It can particularly clearly be seen from FIG. 2 that due to the short line paths, the spatial proximity of the vacuum tank 18 facilitates applying a vacuum to the second vacuum circuit 11 when required. Likewise, it can be seen from FIG. 2, in particular in combination with FIG. 1, that when an alarm is given, the component 3 may be slowed down in its movement by the support part 5 or the support arm 6 and/or lowered in the vertical direction so as to avoid damage to operators and/or systems if the component is lost.

FIG. 3 serves for illustrating the interconnection principle of the redundant embodiment of the second vacuum circuit 11. In FIG. 3a and FIG. 3b, possible connection patterns of a plurality of suction elements 4 arranged in an array-like manner in a first and a second vacuum circuit 9, 11 are shown by way of example. The suction elements 4 associated with the first vacuum circuit 9 or the first group 12 of suction elements 4 are marked with a dot within the suction element 4. The suction elements 4 associated with the second group 13 and/or the second vacuum circuit 11 are marked with a second dashed ring around the respective suction element 4. The suction elements 4 are merely schematically indicated in plan view without a support part 5 or vacuum generators 8, 10, wherein in the image plane, a component 3 can be seen, the surface 23 of which serves as an ideal flat surface as suction plane 19 for the suction elements 4.

In this regard, in FIG. 3a, the possibility is shown to join a first group 12 of suction elements 4 into a first vacuum circuit 9. The shown arrangement where every other suction element 4 is associated with the first vacuum circuit 9 is only one of many possible arrangements. The first group 12 of suction elements 4 primarily serves for receiving and conveying a component 3, while it can be seen from the plan view that the second group 13 of suction elements 4 is in contact with the component 3 at the suction plane 19 but not active during normal operation. As described above, in the event of an alarm, the second vacuum circuit 11 is activated, and the component 3 may be held at least for a short period of time. The lines or the line network required for separate supply of the first and second vacuum circuits 9, 11 in FIG. 3a are not shown.

In FIG. 3b, a possible alternative arrangement or interconnection by means of a line network that may be jointly used for the first and second vacuum circuits 9, 11 is indicated. Thus, the first group 12 of suction elements 4 may be simultaneously associated with the first and second vacuum circuits 9, 11, wherein during normal operation, only the first vacuum circuit 9, i.e. the vacuum supply by means of the first vacuum generator 8, is active. In the event of an emergency or an alarm, the line network of the first vacuum circuit 9 may be used by adding or switching to the second vacuum circuit 11, wherein the vacuum at the suction elements 4 may be maintained at least for a short period of time by means of the vacuum tank 18.

A possible embodiment of a vacuum gripper 1 with a support part 5 having adjustable suction elements 4 is outlined in FIG. 4 by way of example. There, a plurality of suction elements 4 can be seen, which are adjustable at least in a direction of the suction plane 19, i.e. substantially parallel to a component surface 23 to be contacted. Dashed lines indicate positions in which the suction elements 4 would grip a cutout 24 or opening of the component 3; therefore, in the selected illustration, the suction elements 4 have been adjusted such that all suction elements 4 are in contact with the component 3. The suction elements 4 may either be separately adjustable or by means of adjustable holding elements 27, as shown in the exemplary illustration. The suction elements 4 and/or holding elements 27 may be adjusted by means of electric and/or pneumatic drives, which are not shown in detail, and controlled by the system control 14.

It is also possible that the suction elements 4 are height-adjustably and/or pivotably attached relative to the support part 5 and/or a holding element 27. Such an embodiment is not shown here as for the person skilled in the art, the teaching should be sufficient that unevenness and/or distortion of the component may be compensated this way.

In addition, or as an independent embodiment, it may be advantageous if the support part 5 of the vacuum gripper 1 has one or multiple support part elements 7, which are pivotably or rotatably attached to the support part 5. Such a possible embodiment is shown in FIG. 5 by way of example, where two support part elements 7 are pivoted upward in the vertical direction. The support part elements 7 may be moved by means of their own electric and/or pneumatic drives. Through an information stored in the system control 14 on the dimensions and/or the geometry of the components 3 to be conveyed, the support part elements 7 may be used for increasing or reducing the available suction plane 19 if required. The support part elements 7 may also have adjustable holding elements 27 and/or adjustable suction elements 4. The suction elements 4 may be controlled or associated with a first and/or second vacuum circuit 9, 11 by analogy with the aforementioned examples. As can be seen from FIG. 5, this measure may be used for adapting the available number of suction elements 4 or the space required by the support part 5 in an easy and automated manner.

The vacuum grippers 1 shown in FIGS. 1 and 2 and in FIGS. 4 and 5 may have one or multiple second sensor devices 17, which are not shown in detail and configured as optical sensors. The person skilled in the art may easily imagine that such sensors and in particular their light sources may also be arranged within a suction element 4, as indicated by FIGS. 2, 4 and 5. The first and second sensor devices 16, 17 are not shown separately in detail in these embodiments as it is on the person skilled in the art to choose suitable positions and/or sensors according to the above information and arrange them as required.

The illustrations of FIG. 1 to FIG. 5 show possible embodiments; however, it should be noted at this point that the invention is not limited to the embodiments specifically shown; rather, one or multiple combinations of the individual embodiments are possible. For the sake of brevity, no separate illustration is made, and reference is made to the general description.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

LIST OF REFERENCE NUMBERS

1 Vacuum gripper
2 Machine tool
3 Component
4 Suction element
5 Support part
6 Support arm
7 Support part element
8 First vacuum generator
9 First vacuum circuit
10 Second vacuum generator
11 Second vacuum circuit
12 First group
13 Second group
14 System controller
15 Compressed air supply
16 First sensor device
17 Second sensor device
18 Vacuum tank
19 Suction plane
20 Optical and/or acoustic warning device
21 Environment monitoring means
22 Area of movement/machining area
23 Surface
24 Cutout
25 Pick-up location
26 Deposition location
27 Holding element

The invention claimed is:

1. An automated vacuum gripper (1) for components (3), comprising
a plurality of suction elements (4), which are arranged at a support part (5),
a first vacuum generator (8) for forming a first vacuum circuit (9),
a second vacuum generator (10) for forming a second vacuum circuit (11),
at least one switching element connected to a system controller (14) for automated switching of the first vacuum circuit (9) to the second vacuum circuit (11),
at least one compressed air supply (15) connected to at least the first and the second vacuum generators (8),
at least one sensor device (16, 17), wherein
the first vacuum generator (8) is associated with a first predeterminable group (12) of suction elements (4), and the second vacuum generator (10) is connected to a vacuum tank (18) for forming the second vacuum circuit (11), configured to be activated in case of emergency and is redundant to the first vacuum circuit (9), and at least one first sensor device (16) is formed for monitoring the vacuum at least at the first vacuum circuit (9), and at least one second sensor device (17) has an optical sensor for detecting a relative movement of the component (3) during a conveying operation.

2. The vacuum gripper (1) according to claim 1, wherein the second vacuum generator (10) and the vacuum tank (18) are arranged at the support part (5), wherein the support part (5) is arranged at a movable support arm (6) of the vacuum gripper (1).

3. The vacuum gripper (1) according to claim 1, wherein a volume of the vacuum tank (18) is greater than a total volume of at least the first predeterminable group (12) of suction elements (4).

4. The vacuum gripper (1) according to claim 1, wherein the at least one optical sensor comprises a light source, which is configured as a light-emitting diode or a laser diode with a predeterminable wave length range.

5. The vacuum gripper (1) according to claim 1, wherein the at least one optical sensor is arranged at the support part (5) and/or within a suction element (4).

6. The vacuum gripper (1) according to claim 1, wherein at least two second optical sensor devices (17) are arranged at the support part (5) at or within different suction elements (4).

7. The vacuum gripper (1) according to claim 1, wherein the second vacuum circuit (11) is formed at separate suction elements (4), which form a second group (13) and are additional to the first group (12).

8. The vacuum gripper (1) according to claim 1, wherein the second vacuum circuit (11) is connected to the first vacuum circuit (9).

9. The vacuum gripper (1) according to claim 1, wherein at least two of the suction elements (4) are pivotable relative to the support part (5) and/or to a suction plane (19) and/or are height-adjustably arranged at the support part (5).

10. The vacuum gripper (1) according to claim 1, wherein at least one suction element (4) is adjustably arranged at the support part (5) relative to, the suction plane (19).

11. The vacuum gripper (1) according to claim 1, wherein the support part (5) has at least one support part element (7), which is pivotable or rotatable relative to a suction plane (19).

12. The vacuum gripper (1) according to claim 1, wherein an acoustic and/or optical warning device (20) is arranged at the support part (5) and/or a housing of the vacuum gripper (1) and/or a machine tool (2) and connected to the system controller (14).

13. The vacuum gripper (1) according to claim 1, wherein an optical environment monitoring means (21) is connected to the system controller (14).

14. A method for conveying plate-shaped components (3), the method comprising the following method steps:
providing the automated vacuum gripper (1) according to claim 1;
picking a component (3) up by means of the vacuum gripper (1) by creating a vacuum at at least one suction element (4) and a surface (23) of the component (3), thus forming a first vacuum circuit (9);
continuously monitoring the vacuum of the first vacuum circuit (9) by means of at least one first sensor device (16);
continuously monitoring a position of the component (3) relative to at least one second sensor device (17) of the vacuum gripper (1), wherein the sensor device (17) is configured as an optical sensor;
conveying the component (3) to a predeterminable destination, wherein, if a relative movement of the component (3) and/or an increase in pressure in the first vacuum circuit (9) has been detected, an alarm is triggered in the system controller (14).

15. The method according to claim 14, wherein in the case of a detected relative movement of the component (3) and/or unintentional interruption of the first vacuum circuit (9), a second vacuum circuit (11), which is redundant to the first vacuum circuit (9), is activated, wherein a vacuum tank (18) is used for supplying the second vacuum circuit (11) for a short period of time.

16. The method according to claim 14, wherein in the event of a detected movement within a machining area (22) of the vacuum gripper (1), an alarm in the system controller (14) is triggered by an environment monitoring means connected to the system controller.

17. The method according to claim 14, wherein when an alarm is triggered, the speed of movement of a support arm (6) of the vacuum gripper (1) is reduced in a controlled manner and/or the conveyed component (3) is lowered in the vertical direction.

18. The method according to claim 14, wherein when an alarm is triggered in the system controller (14), an acoustic and/or optical warning device (20) is activated at the support part (5) and/or a housing of the vacuum gripper (1).

* * * * *

UNITED STATES PATENT AND TRADEMARK OFFICE
CERTIFICATE OF CORRECTION

| | | |
|---|---|---|
| PATENT NO. | : 12,134,527 B2 | |
| APPLICATION NO. | : 17/274970 | |
| DATED | : November 5, 2024 | |
| INVENTOR(S) | : Kabir Secibovic | |

It is certified that error appears in the above-identified patent and that said Letters Patent is hereby corrected as shown below:

In the Claims

In Column 13, Line 6 (Line 20 of Claim 1): after "circuit (11)" delete ","

Signed and Sealed this
Third Day of December, 2024

*Katherine Kelly Vidal*

Katherine Kelly Vidal
*Director of the United States Patent and Trademark Office*